W. E. URSCHEL.
APPARATUS FOR AND PROCESS OF STEMMING FRUIT.
APPLICATION FILED MAY 29, 1918.
1,409,803.
Patented Mar. 14, 1922.
2 SHEETS—SHEET 1.
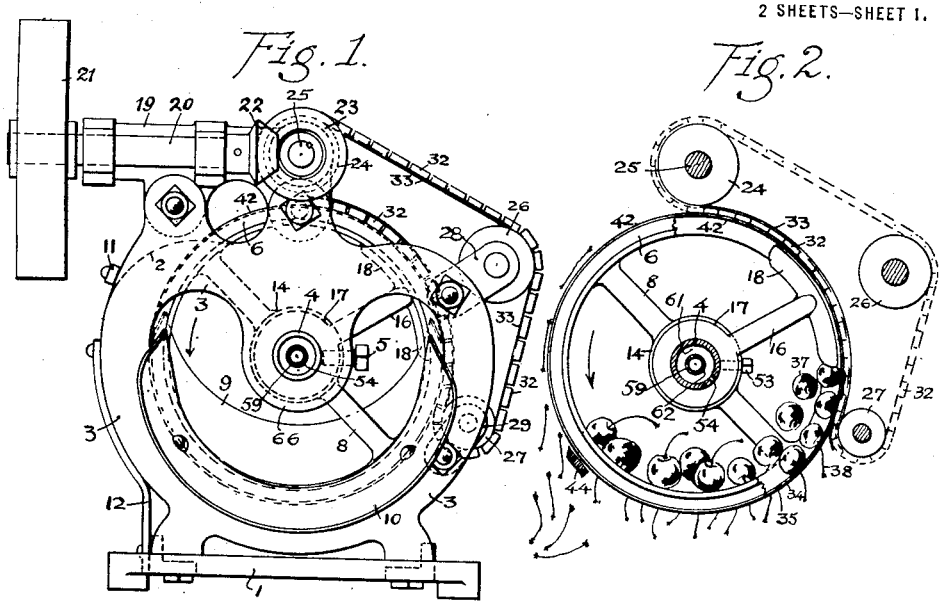
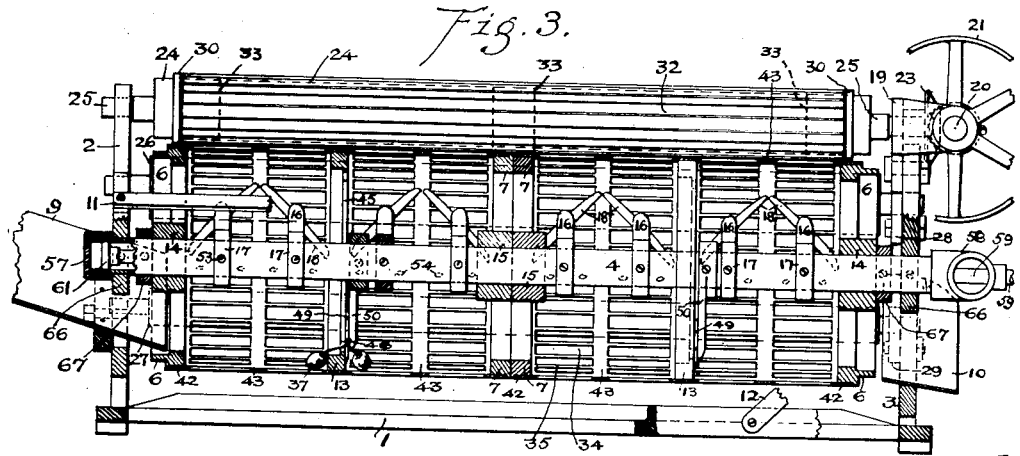
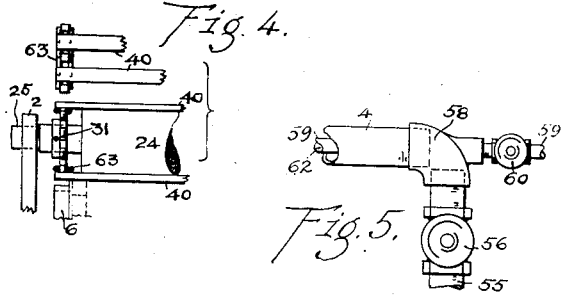
William E. Urschel Inventor
By N. S. Amstutz
Attorney W. E. URSCHEL.
APPARATUS FOR AND PROCESS OF STEMMING FRUIT.
APPLICATION FILED MAY 29, 1918.
1,409,803.
Patented Mar. 14, 1922.
2 SHEETS—SHEET 2.
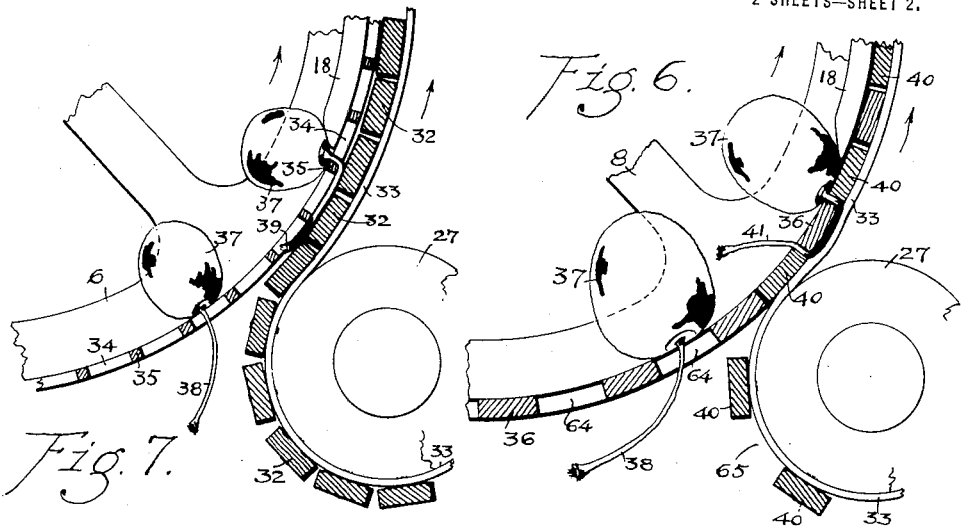
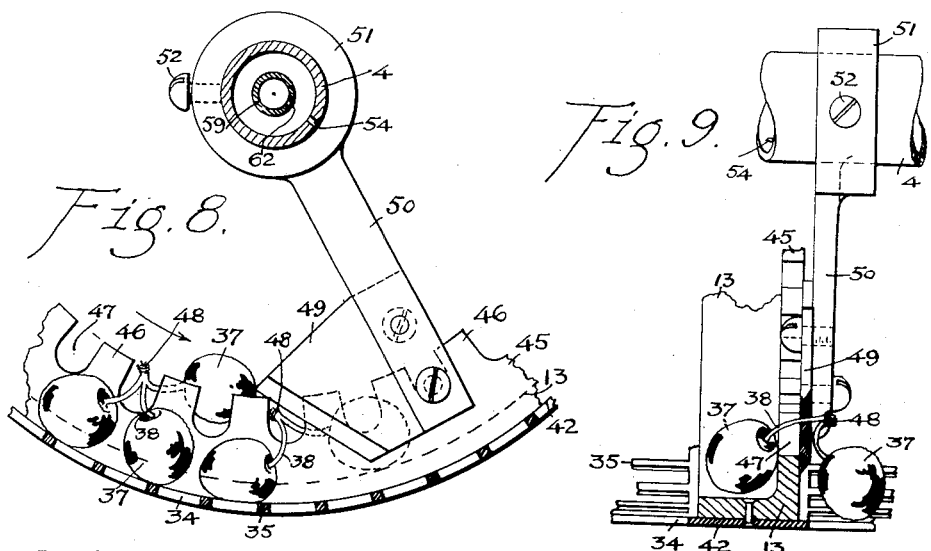
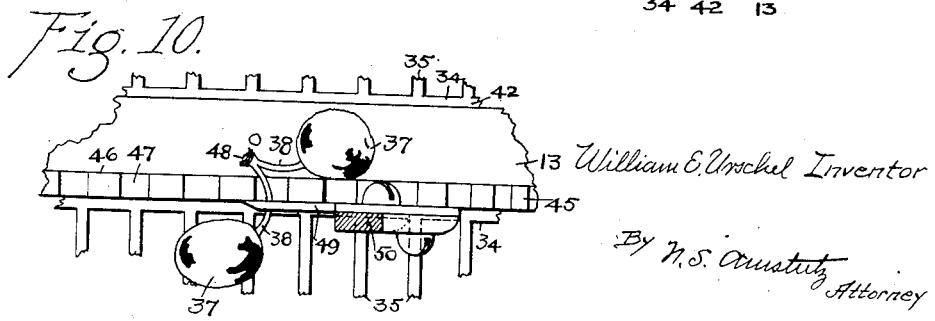
William E. Urschel Inventor
By N. S. Amstutz
Attorney

UNITED STATES PATENT OFFICE.

WILLIAM E. URSCHEL, OF VALPARAISO, INDIANA.

APPARATUS FOR AND PROCESS OF STEMMING FRUIT.

1,409,803.  Specification of Letters Patent.  Patented Mar. 14, 1922.

Application filed May 29, 1918. Serial No. 237,245.

*To all whom it may concern:*

Be it known that I, WILLIAM E. URSCHEL, citizen of the United States, residing at Valparaiso, in the county of Porter and State of Indiana, have invented certain new and useful Improvements in Apparatus for and Processes of Stemming Fruit, of which the following is a specification.

My invention relates to improvements in apparatus for and process of stemming fruit and it more especially relates to the features pointed out in the annexed claims.

The object of my invention is to provide a fruit stemmer that is automatic throughout; that will handle even moderately soft fruit without injury; that will separate clusters of united stems; that will positively grasp the stems and as positively push the fruit away in an uninjured manner; that provides a relatively smooth surface at the point where the fruit is stemmed; that provides means for washing the fruit while it is being stemmed; that uses air pressure conducted through associated means to assist in causing the stems of the fruit to be more rapidly placed in position for stemming; and that may combine the use of water and air streams at the same time or separately as desired.

With these and related ends in view I illustrate in the accompanying drawings such instances of adaptation as will disclose the broad underlying features without limiting myself to the specific details shown. It is understood and herewith made a part of the disclosure that this invention is of commanding importance, including all alternative expedients in the broadest interpretation thereof; that utilizes a stemming method in which the fruit is made to automatically change its position so as to have repeated opportunities for the stemming action; in which the stemming means and the means for shifting the fruit move adjacent each other at the same rate of travel; and in which the fruit is removed from the stems by an independent provision acting in opposition to the other means.

Fig. 1 is an end elevation of a fruit stemmer.

Fig. 2 is a diagrammatic end elevation of the stemming function removed from the constructive details shown in Fig. 1. An enlarged view of this function is also shown in Figs. 6 and 7.

Fig. 3 is a side elevation of Fig. 1 in section.

Fig. 4 is a detached detail instancing the use of chains for actuating the stemming web.

Fig. 5 is a detached detail of a combined air and water supply.

Fig. 6 (Sheet 2) is an enlarged diagrammatic view in section instancing a web with interspaced slats matching the open spaces of the fruit carrier so as to leave a practically smooth surface at the point where the fruit is pushed off from the stems.

Fig. 7 is a similar diagrammatic view to Fig. 6, but showing the arrangement of stemming slats instanced in Fig. 2.

Fig. 8 is a diagrammatic elevation of a cluster separator.

Fig. 9 is a front elevation of Fig. 8.

Fig. 10 is a plan view of Figs. 8 and 9.

In practically carrying out my invention I may use the expedients instanced in the accompanying drawings or any and all alternatives thereof without departing from the broad spirit of the invention.

Any form of under frame 1 is set at an inclination so as to assist in the progress of the fruit such as cherries, etc., through the stemmer. At the receiving end a frame 2 is placed and at the delivery end another frame 3 is secured. In the centers 66 of these frames a tubular shaft 4 is held against rotation by set screws 5. End rings 6 are free to revolve around the shaft 4 between collars 67 on their hubs 14 which are connected to the rings by spokes 8. Central rings 6 and 7 form the skeleton part of the drum that acts as a carrier for the fruit. They are attached to the perforated shell 42 so as to form a revoluble unit that may be driven in any desired manner. In the instance cited this is accomplished by means of pulley 21 attached to the outer end of shaft 20 that has bearing in a bracket 19 secured to end frame 3. The inner end of shaft 20 carries a bevel pinion 22 that meshes with a bevel gear 23 fastened to the shaft 25 of the web drive roller 24. A slatted web 33 passes around this roller, a middle idler 26 and a lower one 27. Slats 32 on the web 33 engage the shell 42 of the drum and thus cause the drum to revolve in unison with the travel of the web.

The fruit is fed into chute 9 which delivers it to the inside of the drum where it is continuously shifted into new positions before being delivered over chute 10. As the fruit 37 passes through the drum its stems 38 will project through the longitudinal slots 34 or 64 divided into lengthwise groups as shown in Fig. 3. Narrow bars 35 or wide ones 36 separate the slots 34 and 64 thus preventing the fruit from dropping through. As the drum is rotated in the direction of the arrow shown in Fig. 2 through a movement of the web 33 the fruit 37 is carried so that all projecting stems 38 will be engaged by the slats 32 or 40 and firmly held against the drum shell 42 as the slats and bars travel together.

If no other provision were made the stems and attached fruit would simply be carried along together to the top of the drum where the web 33 leaves it and dropped down unstemmed repeating the operation over and over. To avoid this useless procedure angularly placed pusher blades or bars 18 are disposed inside of the drum as shown in Figs. 2 and 3. These pushers are held against movement with the drum by arms 16, hubs 17 and set screws 53. Their action is clearly shown in Figs. 2, 6 and 7. They push the cherry or other fruit from the clamped stems to roll down the inside of the drum shell 42 and finally pass over chute 10. To prevent unstemmed fruit sliding along lengthwise of the slots 34 if they were continuous, circular divisions 43 are joined to bars 32 or 36. The shell 42 may be made in circular and longitudinal sections fastened to the rings 6 and 7 in any desired manner by rivets shown in Fig. 9 or otherwise.

The pushers 18 are placed at an angle so as to more gently remove the fruit from the stems and also prevent them engaging the bars 35 or 36 to the possible injury of the mechanism. Since these pushers are adjustable on the shaft 4 they may be placed in different positions with respect to each other according to any varying demands found in practice.

The web 33 may be composed of closely spaced slats 32 exemplified in Fig. 7 or more widely spaced slats 40 shown in Fig. 6. The latter relation of parts will more firmly hold the stems and at the same time form a positive driving means to rotate the drum, the slats 40 entering slots 64 of the drum and the bars 36 entering the space 65 between slats 40. In cases where this type of drive is used there is no possibility of any slipping action taking place. The web 33 and attached slats may be prevented from endwise movement by flanges 30 formed near each end of roller 24.

If it is desired to positively drive both edges in step with each other bars 40 may project from the web 33 and be attached to the links of a chain 63 passing over driving sprockets 31 at each end of roller shaft 25 shown in Fig. 4. Similar sprockets would be placed at the ends of idler rollers 26 and 27. Fig. 4 shows a section and a plan view above of this expedient.

The stemming action is almost an obvious one as an examination of Figs. 6 and 7 will show. In the former the stem 41 is clamped between a bar 36, two slats 40 and the web 33 while in Fig. 7 a stem 39 is clamped between two bars 35 and adjacent slats 32. In either case the clamped stems after the fruit has been removed by the pushers 18 are carried upward and by reason of their being pressed into the open spaces 34 or 64 will be brought to the under side of the drum to drop off by gravity or if needed a stem scraper 44 may be used for this purpose. The use of intermeshing bars and slats exemplified in Fig. 6 is especially desirable while treating tender fruit as the inner surface against which the fruit is forced by the pusher is practically smooth, the outer faces of the slats and the inner faces of the bars being flush with each other little or no injury will result to the fruit.

In order that the rollers 24, 26 and 27 may be more readily assembled without dismantling the end frames 2 and 3, brackets at the delivery end may be used, as 19 for roller 24, 28 for idler 26 and 29 for idler 27. The frames 2 and 3 may be further held the proper distance apart by a bar 11 shown in Fig. 1 and an angle brace 12 attached to the base 1 and frame 3 also adds to the rigidity of the parts.

Provision is made to separate stems attached to each other in groups as at 48 Figs. 8, 9 and 10. Open centered rings 13 are secured to the inside of the drum shell 42 shown in Fig. 3 at different places lengthwise of the drum. These rings have radial flanges 45 in which teeth 46 are formed between notches 47. Alongside of this flange a knife is held by arm 50 whose hub 51 is held on stationary shaft 4. As grouped stems encounter the notches 47 they are pulled along by the teeth 46 into engagement with the knife 49 to separate them for more rapid stemming action. This function is not limited to fruit stemmers but it may also be used for separating attached bean pods, etc., in bean graders and bean snippers.

As previously stated the hollow shaft 4 serves as a bearing for the rings 6 and 7. In addition it also serves to deliver water or air or both mixed through perforations 54 to wash the fruit and cause the stems to more rapidly protrude themselves through the drum slots in advance of the clamping action. If water alone is used it is brought through inlet pipe 55 past valve 56 and elbow 58 into pipe 4 that is closed at the other end by a cap 57. Whenever air alone is to be used it can be admitted through the same pipes, but when both air and water are to be used at the same time then an additional pipe 59 with perforations 62 may be placed inside of shaft 4 supported at its capped end by a plug 61. Flow through the pipe 59 is controlled by a valve 60 so as to, in connection with the valve 56, easily regulate the admission of whatever agency is desired or both combined with each other.

It will be seen that the expedients which have been instanced are adequate, simple and efficient in operation.

Another alternative that employs substantially the same features shown in the drawings may be used in the same manner as disclosed in Fig. 2 if the right hand edge is taken as the base when the use of the pusher blades 18 may be dispensed with. The space between slats is increased similar to 65 in Fig. 6 and the slats 40 are made to register with and keep step with the bars 36. As the tapes or webs 33 have an opening between them, stems 38 will pass through slots or perforations 34 and also spaces 65 so that as they are carried upward the protruding stems are caught between the slats 40 and roller 24 to be pulled off the fruit as the slats 40 move away from bars 36. The detail features of such an expedient are however not claimed herein but may be made the subject of a separate application.

A valuable feature of this invention resides in the fact that fruit which is stemmed in the act of picking is not needlessly carried upward by the drum to the stemming position but simply travels from chute 9 to chute 10 along the lower portion of the drum without interfering with the automatic selection of any unstemmed fruit for further treatment.

What I claim is,

1. In fruit stemmers, a holder for fruit provided with apertures through which the fruit stems may protrude, means for changing the position of the fruit within the holder, an endless clamping web moving adjacent to and carrying with it the fruit holder so as to clamp the fruit stems between it and the holder, and means within the holder acting in opposition to the movement of the other parts adapted thereby to automatically separate the fruit from the stems.

2. The process of stemming fruit, consisting in intermittently changing the position of the fruit to be stemmed while retained on one side of a perforated wall, in causing the stems to variously protrude through the perforations, in causing the protruding stems to be clamped against the other face of the retaining wall and in subsequently causing the fruit and stems to be separated by stopping movement of the fruit on the one side of the wall while the stems are clamped against the other side of said wall.

3. The process of stemming fruit, which consists in placing the fruit on one side of a perforated wall, in placing a movable clamping means adjacent the other side of said wall, in causing the fruit to be shifted from place to place against the wall so as to secure repetitive opportunities for the stems to protrude through the perforations, in causing the movable clamping means to positively hold the protruding stems against one side of said wall, and in stopping movement of the fruit on the other side of the wall while its stems are moved and are so held to separate the same from the fruit.

4. In fruit stemmers, a rotatable perforated support adapted to cause the fruit to be agitated thereon so as to protrude the stems therethrough, means for clamping the protruding stems against the support upon the side from which they protrude and means within the container for stopping movement of the fruit while continuing a movement of the stems as they are held between the support and the clamping means to effect the separation of the stems from the fruit.

5. The process of stemming fruit consisting in causing the fruit to change its position within a rotating perforated holder, in causing groups of attached stems to be first separated, in forcibly holding the separated stems against the outside of this holder, and in subsequently causing the moving fruit to be stopped within the holder while continuing a movement of the stems whereby they are separated from each other.

6. In fruit stemmers, a rotative perforate drum, means for supplying fruit thereto, a clamping web moving in contact with the drum for a portion of its revolution, pusher bars within the drum adapted to resist movement of objects adjacent thereto, and means for imparting movement to the holder through the clamping web.

7. The process of stemming fruit, consisting in causing the fruit to change its position within a rotating container having a perforated wall, in causing the fruit to remain on one side of said container wall, in causing the stems to pass through the perforations and project from the other side of the wall, in stopping a movement of the fruit while continuing a movement of the stems to thereby pull the stems away from the fruit.

8. In fruit stemmers, a perforated container wall, means for holding fruit on one side of said wall, means for causing movement of the fruit by actuating the container, means for periodically or intermittently clamping selected stems against the other side of the container wall, other means adapted to cause the clamping means to actuate the container, and means for arresting the movement of the fruit while continuing the movement of the stems to separate the stems from the fruit.

9. In fruit stemmers, a rotatable drum provided with perforations, a supporting frame, a feeding chute leading thereto, a delivery chute leading therefrom, a clamping web adapted to move in contact with the drum for a portion of its circumference, means for imparting motion to the web and through it to the drum so as to cause both to travel together, and a stationary member within the drum terminating adjacent the inner face thereof, whereby as fruit stems project through the perforations they are held against the outer surface of the drum by the clamping means and are caused to travel therewith during which time the fruit is pulled off the stem on the inner face of the drum.

10. In fruit stemmers, a rotatable drum having perforations in its wall, ring supports therein, stationary shaft therefor, a frame for the shaft, a plurality of rollers external of the drum, bearings for the same, an endless web on the rollers said web being adapted to engage an arc of the drum, means for driving the web and stationary coacting means placed adjacent the perforated drum wall, whereby as the web moves the drum is caused to travel in unison therewith so that an enlarged part of an object being within the drum and the smaller part being clamped by the web the stationary means will separate the two.

11. In fruit stemmers, a movable perforated container, means for agitating fruit thereon to cause the stems to variously protrude therethrough, means for clamping the stems against the side from which they protrude so that they shall move with the container and the clamping means, and means on the fruit supporting side of the holder for stopping movement of the fruit while the stems are being pulled therefrom.

12. In the manipulation of fruit, vegetables, etc., a container, an annular ring having radial notches projecting toward its center secured to the container, severing means placed adjacent to the notched member the same being adapted to separate adhering groups of fruits and vegetables, etc., and means for producing relative movement between the severing means and the notched member.

In testimony whereof I affix my signature.

WILLIAM E. URSCHEL.